United States Patent [19]
Krause

[11] Patent Number: 5,298,215
[45] Date of Patent: Mar. 29, 1994

[54] METHOD FOR INJECTION MOLDING OBJECTS OF AT LEAST TWO PARTS

[75] Inventor: Reinhard Krause, Brand bie Marktredwitz, Fed. Rep. of Germany

[73] Assignee: Fickenscher & Co. GmbH Werkzeugund Formenbau, Selb, Fed. Rep. of Germany

[21] Appl. No.: 7,428

[22] Filed: Jan. 22, 1993

[30] Foreign Application Priority Data

Jan. 29, 1992 [DE] Fed. Rep. of Germany ........ 4202351

[51] Int. Cl.⁵ ............................................. B29C 45/00
[52] U.S. Cl. .................................... 264/242; 264/264; 264/266
[58] Field of Search .................. 264/242, 266, 264

[56] References Cited

U.S. PATENT DOCUMENTS

| | | | |
|---|---|---|---|
| 1,867,540 | 7/1932 | Rosenberg | 264/266 |
| 2,932,081 | 4/1960 | Witte | 264/266 |
| 3,099,879 | 8/1963 | Horovitz | 264/266 |
| 3,961,770 | 6/1976 | Wrasman | 264/242 |
| 4,290,181 | 9/1981 | Jackson | 264/264 |

Primary Examiner—James Derrington
Attorney, Agent, or Firm—Jordan and Hamburg

[57] ABSTRACT

In a method for the injection molding of objects of at least two independent parts, which are connected non-detachably but mutually rotatably, the subsequently produced part being injected at least partially into a mold recess of the previously produced part or injected at least partially about the previously produced part, an approximately hollow, cylindrical element (1) is molded to the part produced first in the region connecting this part to a rotatable part (18) that is to be produced subsequently, which hollow, cylindrical element (1) is thereupon surrounded by a mold (10) for the subsequent part (18) and, for the production of this part (18), either the outer space of the hollow, cylindrical element (1), which is closed off by a core, or the inner space (9) of this hollow, cylindrical element (1), which is not closed off, is injected for the production of this part (18), the part produced first being deformed in the region of the hollow cylinder (1) into an undercut with rotational symmetry by the pressure of the material injected.

6 Claims, 1 Drawing Sheet

METHOD FOR INJECTION MOLDING OBJECTS OF AT LEAST TWO PARTS

BACKGROUND OF THE INVENTION

The invention relates to a method for the injection molding of objects of at least two independent parts, which are connected nondetachably but mutually rotatably the subsequently produced part being injected at least partially into a mold recess of the previously produced part or injected at least partially about the previously produced part.

There are a plurality of utensils, which are produced by injection molding from different plastics. Among these utensils, there are also those, which consist of several movable parts, which are connected with one another. The parts involved can be connected by a joint, rotate about an axis, carry out linear motions or also, in some cases, carry out very complex motions. Previously, such parts were made individually and assembled or allocated to one another in expensive manual or automatic operating processes. It has meanwhile become known that, starting out from a part that is produced first, the parts, which are to be connected with this nondetachably but movably, can be molded directly onto the first part. For this purpose, the part produced first forms a cutout of the mold for the part or parts formed subsequently. Fusion of the parts to one another is prevented owing to the fact that a plastic, which can be exposed briefly to high temperatures, is used for the part produced first.

In order to obtain a nondetachable, yet movable connection, an undercut must be molded to the plastic part produced first. Since such an undercut for a detachable, but, at the same time movable connection of two parts in almost all cases must be spherical, an at least 2-part mold, the two halves of which abut in the region of the undercut, is required to produce such an undercut. This is so because the removal of the injection molding, which forms a cutout during the production of a subsequent plastic part in the mold of that part, can take place only owing to the fact that the first mold is separated in the region of the undercut. However, the use of a mold, which is to be separated in the region of the undercut, is associated with a plurality of disadvantages. There will already be an edge in the injection molding if the two halves of the mold are not aligned with the utmost precision and have only a minor mismatch. Since especially this region, which has the undercut, forms a cutout of the mold in the subsequent step of the operation for the next injection molding, a surface unevenness, complementary to the edge of the first part, is formed when this next injection molding is produced. These mutually engaging edges form, as it were, a stop for the relative motion of the two connected parts. Moreover, these surface unevennesses result in increased frictional forces. Not all the difficulties are eliminated even if the two halves of the mold are aligned extremely accurately. If there is the slightest damage to the edge of one or both mold halves, a burr is formed at the part formed first. This burr gives rise to a complementary groove on the injection molding produced subsequently, so that a locking element consisting of a locking nose and a corresponding depression is formed. This also contributes to irregular rotational movements. Since the rotational mobility is limited appreciably or even made impossible by burrs larger than a particular size, relatively short service lives are observed for the molds in order to avoid rejects. Appreciable expenses arise out of this for the production of molds.

SUMMARY OF THE INVENTION

Out of these problems arises the problem on which the invention is based, namely that of providing a method for the injection molding of objects of at least two independent parts, which are connected nondetachably but mutually rotatable, the part produced first in each case forming a cutout of the mold for the subsequently produced part and having, in the region of the undercut that brings about the nondetachable but mutually rotatable connection of the two parts, a completely smooth surface due to the principle employed in its production.

For this purpose, the invention provides that an approximately hollow, cylindrical element be molded to the part produced first in the region connecting this part to a rotatable part that is to be produced later. The hollow, cylindrical element is thereupon surrounded by a mold for the subsequent part. Either the outer space of the hollow, cylindrical element closed off, by a core or the inner space of this hollow, cylindrical element, which is not closed off is injected for the production of this subsequent part, the part produced first being deformed into an undercut with rotational symmetry by the pressure of the material injected in the region of the hollow cylinder. In this connection, the longitudinal axis of the hollow, cylindrical element, which is molded to the part produced first, defines the axis of rotation of the rotatable connection. A portion of the surface of this hollow, cylindrical element—either the inner or the outer cylindrical surface—functions as sliding surface for the part connected movably with the first part. The undercut necessary for the indissolubility of the connection is produced by the deformation of the hollow, cylindrical element during the injection process for the injection molding rotatably coupled. The hollow, cylindrical element can be produced without separating the mold at least in the region in question. Rather, a portion of the mold is removed in the direction parallel to the axis of the hollow cylinder after the completion of the injection molding. Accordingly, the burs and/or edges, which unavoidably occur at the contact sites of the two halves of the mold necessary for the removal of the plastic part, are outside of the region of contact of the two parts, which are rotatably connected with one another. The surfaces of the hollow, cylindrical element therefore are optimally smooth. This surface property is not changed even during the deformation of the hollow, cylindrical element to an undercut with rotational symmetry. The rotational mobility of the individual parts of the finished object is not impaired and, in particular, does not depend on manufacturing factors, which are difficult to control.

When a subsequently produced part is injected at least partially into a mold recess of the previously produced part, it has proven to be advantageous to mold an approximately hollow, cylindrical element, which is free of burs on its inside, to the part produced first in the region connecting this part to a rotatable part, which is to be produced subsequently. This element is thereupon enclosed by a mold for the subsequent part, the inside of which is provided in the region of the hollow, cylindrical element with a depression having a cross section that is constant over the whole perimeter of said element. The subsequent part is then injected, the part produced first being pressed towards the outside and fitted against the depression on the inside of the mold in the region of the hollow cylinder by the pressure of the injected material. As already described above, the hollow, cylindrical element, which is free of burs on its inside, can be produced by means of a cylindrical core, which is retractable axially after the solidification. After the removal of the part produced first from its mold, it is inserted in a mold for the production of a further, rotatably connected part in such a manner, that the hollow, cylindrical element is tightly enclosed on the outside in the region of its free end. This mold, of which the hollow, cylindrical element with its interior space in this state forms a cutout, has a depression of constant cross section over the whole extent of this element. Accordingly, there is an annular cavity between the outer shell of the hollow, cylindrical element and the part of the mold surrounding this hollow, cylindrical element. This cavity can be disposed at a convenient place in the longitudinal direction of the hollow cylinder between the two ends of this cylinder. It may also comprise almost the whole height of the hollow, cylindrical element. In the injection process which now follows, the plastic completely fills the mold as well as the interior space of the hollow, cylindrical element, which is connected with the mold. Due to the pressure of the injected material, the relatively thin-walled hollow cylinder is deformed in the radial direction in the region of the annular cavity. Due to the high elasticity of the plastic material, this deformation is limited only after the originally hollow, cylindrical element comes to lie against the surface of the annular depression on the inside of the mold. Because of the constant wall thickness of the hollow, cylindrical element, the contour of the annular depression on the inside of the mold is reproduced on the surface of the inner shell of the cylinder, which therefore forms an annular undercut of uniform cross section.

Pursuant to the invention, the depression on the inside of the mold for the subsequent part is curved concavely in the axial direction of the hollow cylinder. So that the relatively thin-walled hollow, cylindrical element is not subjected to excessive stretching as it is being caused to bulge, due to a cross sectional step-shaped formation of the annular depression and, with that, exposed to the danger of damage or even of tearing off, the annular depression of the mold has a steady profile in a section running through the longitudinal axis of the hollow cylinder. An optimum protection of the hollow, cylindrical element during the deformation ensures a depression curved concavely in profile.

In a modification of this first method for an application, in which at least one subsequently produced part is injected at least around the previously produced part, the inventive innovation lies therein that an approximately hollow, cylindrical element, which is free of burs on the outside, is molded to the part produced first in the region that will connect it to a rotatable part that is to be produced subsequently. The hollow, cylindrical element thereupon is enclosed by a mold for the subsequent part, in which mold a rotationally symmetrical core is disposed concentrically to the hollow, cylindrical element. In its section protruding into the hollow, cylindrical element, the rotationally symmetrical core has a tapering cross section. The subsequent part is then injection molded, the part produced first being pressed inwards in the region of the hollow cylinder by the pressure of the injected material and lying against the tapering section of the core. Thus, with this method also, a hollow, cylindrical element is molded to the previously produced part. In this case, what matters particularly is that the outside of the hollow, cylindrical element is completely smooth, because this represents in the finished state the sliding surface of the nondetachable, but movable connection. For this reason, the subsequently produced plastic part is injection molded for this embodiment of the inventive method into the outer space of the hollow, cylindrical element. So that the hollow cylinder can be deformed towards the inside into an undercut by the pressure of the injected material, the inner space of the hollow cylinder is closed off tightly by a rotational symmetrical core, which prevents penetration of plastic into this region. This core, moreover, also serves to shape the undercut. Therefore, in the region of the free end face of the hollow, cylindrical element, it has a cross section, which corresponds to the clear opening of the hollow, cylindrical element and tapers concentrically about the longitudinal axis of the hollow cylinder towards the base of this cylinder. Therefore, in spite of the pressure acting upon it, the hollow cylinder is not deformed in the region of its free end face during the injection molding of the material, since it is supported at this place by the core. Since this supporting force is absent in the surroundings of the tapering core, the force of the injected material compresses the hollow cylinder, until this cylinder lies over the greater part of its height against the tapering core. Because the wall thickness of the hollow, cylindrical element does not change, the profile of the core is reproduced here on the outer shell surface of the hollow, cylindrical element. The undercut necessary for the nondetachability of the nevertheless movable connection arises out of this.

Finally, in correspondence with the teachings of the invention, the tapering section of the core in the mold for the subsequent part is curved concavely in the axial direction of the hollow cylinder. Even when injection molding around the hollow, cylindrical element, it is important that this element not be stretched excessively by step-like thickenings of the core. For this reason, a steady tapering of the core and, in particular, a concave curvature of the same in the longitudinal section are advantageous.

BRIEF DESCRIPTION OF THE DRAWINGS

Further characteristics, details and advantages of the invention arise out of the following description of a preferred embodiment of the invention, as well as out of the drawing, in which.

DETAILED DESCRIPTION OF THE PREFERRED EMBODIMENTS

Figure 1:
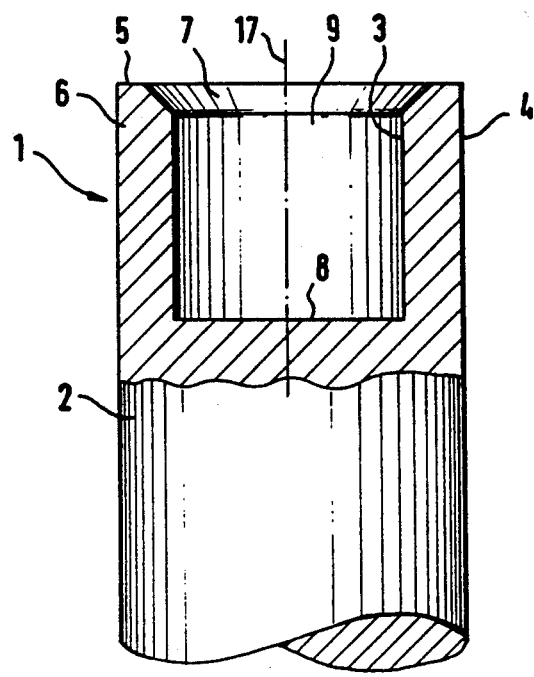
FIG. 1 shows a hollow, cylindrical element, partially in longitudinal section, molded to the part of a connection produced first.

The hollow, cylindrical element 1, shown in FIG. 1, is molded with its foot region 2 to a first plastic part, which is not shown. For both inventive methods for producing a nondetachable, yet rotatable connection between two plastic parts, from the use of which either a connection of FIG. 2 or of FIG. 3 results, the hollow, cylindrical element 1, shown in FIG. 1, equally forms the starting point for the production of the second element of the connection.

The hollow, cylindrical element 1 has an inner cylindrical shell 3 as well as an outer cylindrical shell 4. Depending on the manufacturing method for the subsequently produced part, the inner cylindrical shell 3 or the outer cylindrical shell 4 forms the sliding surface for the rotatable connection and must for this reason have a completely smooth surface. This can be achieved owing to the fact that part of the mold, in which the previously produced plastic part together with the hollow, cylindrical element 1 is produced, is formed in the region of element 1 from a single mold, which is removed in the axial direction of the hollow, cylindrical element 1 after this plastic part is produced. Although the mold nevertheless is separated for the removal of the injection molding, the joint is not in the region of the hollow, cylindrical element 1. This element 1 is therefore ideally smooth at all boundary surfaces, particularly at the inner and outer cylindrical shells 3, 4. The constantly high surface quality is, however, also ensured at the end face 5 of the free end 6 of the hollow, cylindrical element 1, at a chamfer 7 that may be present in the same region 6, as well as at the base 8 of the cylindrical recess 9.

Figure 2:
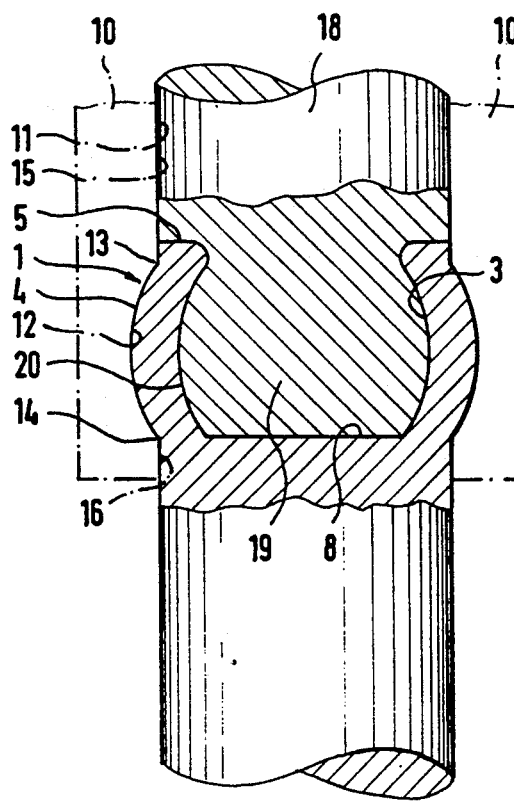
FIG. 2 shows a finished connection between two plastic parts, partly in longitudinal section, which have been produced by an inventive method

In the method for the production of the connection shown in FIG. 2, after the removal of the mold forming the hollow, cylindrical element 1, a further mold 10 is placed tightly against the outer cylindrical shell 4 of the hollow, cylindrical element 1. This mold 10 is provided at its inside 11, in the region between the front end 5 of the hollow, cylindrical element 1 and the base 8 of the encircling, cylindrical recess 9 with an annular depression 12. The depression 12 is rotationally symmetrical with respect to the longitudinal axis 17 of the hollow, cylindrical element. The transitions 13 and 14 between the annular depression 12 and the cylindrical regions 15, 16 of the inner side 11 of the mold 10 are continuous. The depression 12 is described, for example, by the rotation of a segment of a circle, lying in the plane of the drawing, about the longitudinal axis 17 of the hollow, cylindrical element, so that the depression 12 has, for example, a spherical surface structure.

To begin with, there is a cavity between the outer cylindrical shell 4 and the depression 12 in the inner side 11 of the mold 10. By injecting plastic into the space formed by the mold 10 and the recess 9 of the hollow, cylindrical element 1, the hollow, cylindrical element 1 is pressed towards the outside into the mold 10 in the region of the depression 12, until the outer cylindrical shell 4 lies also in the region of the depression 12 against the inner surface 11 of the mold 10. Venting boreholes can be distributed over the periphery of the mold 10 to enable the air enclosed in the annular cavity to escape. However, since the mold 10 must anyhow be separated for the removal of the finished plastic part because of the bulge in the region 12, the enclosed air can also escape through the joint between the two halves of the mold. As soon as the plastic injection molding 18, so formed, has solidified, the mold 10 is separated and the connection is freed.

Because of the constant wall thickness of the original, hollow, cylindrical element 1, the inner casing surface 3 is also deformed rotationally symmetrically to the longitudinal axis 17. The part 19 of the second plastic part 18, which protrudes into the originally cylindrical inner space 9 of the element 1, accordingly assumes a barrel-shaped conformation. As a result, the undercut responsible for the nondetachability of the connection is formed. Because of the rotational symmetry of the barrel-shaped element 19, which is attributable, on the one hand, to the rotational symmetry of the annular depression 12 and, on the other, to the base surface 8 of the recess 9, which is aligned precisely perpendicularly to the longitudinal axis 17 of the original, hollow, cylindrical element 1, there can be relative motion between the two elements of the connection 1, 19 of the form of a rotation about the longitudinal axis 17 of the originally hollow, cylindrical element 1.

Since the connecting element 1 is in a constant state of tension because of elastic deformation, a constantly acting normal force results between the contacting surfaces 3, 20 of the connecting elements 1, 19. This normal force is responsible for a frictional torque, which counteracts each rotation of the two connecting elements 1, 19. If there is no external torque or such a torque is very slight, the connection remains in the set position. On the other hand, to overcome the constantly present frictional torque, a slight external torque is already sufficient because of the very smooth and burr-free surfaces 3, 20 of the connecting elements 1, 19. Accordingly, the connection is, on the one hand, is self-locking and, on the other, easy running.

Figure 3:
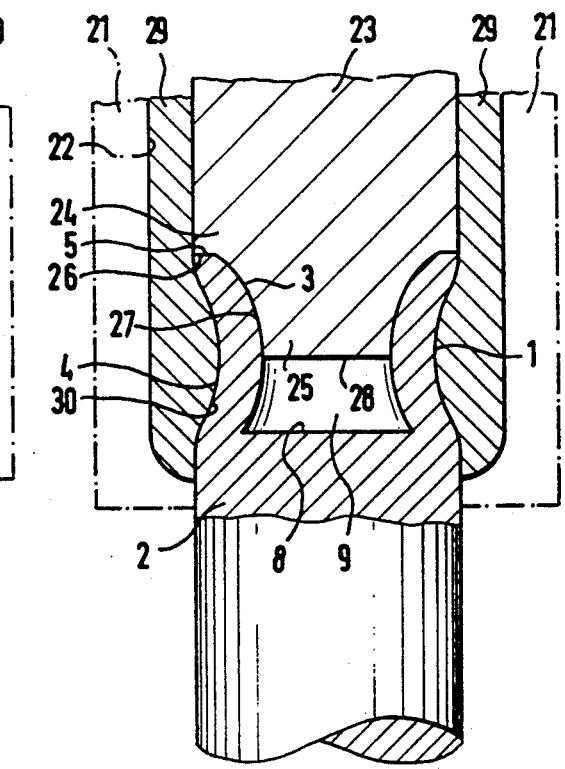
FIG. 3 shows a finished connection between two plastic parts, also partially in longitudinal section, which have been produced by a modified method.

For a method, which deviates from the above and with which the connection shown in FIG. 3 can be produced, the hollow, cylindrical element, after it is removed from its mold, is enclosed tightly by a second mold 21. The mold 21 is at the outer cylindrical casing 4 of the hollow, cylindrical element 1, exclusively of the foot region 2 of this element 1. In a region, which extends from about the base surface 8 of the recess 9 as far as beyond the front end 5 of the hollow, cylindrical element 1, the radius of the inner side 22 of the mold 21 is larger than that of the hollow, cylindrical element 1.

Moreover, the inner space 9 of the hollow, cylindrical element 1 is closed off tightly at the front end 5 of this element by a core 23. The core 23 protrudes by about half the axial length of the hollow, cylindrical element 1 into the recess 9. In its region 24 adjoining the front end 5, the radius of the core 23 is larger than the internal radius at the front end 5 of the hollow, cylindrical element 1, enlarged by the bevel 7. From this part 24 of the core 23, the part 25 dipping into the inner space 9 is offset with formation of a circular shoulder 26 lying against the front end 5 of the hollow cylinder 1. The shell surface 27 of the core part 25 of lesser cross section is shaped in approximately complementary fashion to the chamfer 7 in the region adjoining the gradation 26. This region, which is shaped approximately in the form of a truncated cone, continues approximately to the base surface 8 of the recess 9 as a further tapering of the core 23. In this part of the shell surface 27, the core 23 has approximately the shape of a single-shell hyperboloid, which is rotationally symmetrical to the longitudinal axis 17 of the hollow, cylindrical element 1. The core 23 is closed off by a circular end face 28 approximately in the region of the lowest cross section of this hyperboloid.

After the mold 21 and the core 23 are positioned, plastic is injected into the cavity bounded by the inner wall 22 of the mold 21 on the one hand and the outer cylindrical shell 4 of the hollow, cylindrical element 1 and the core 23 on the other. While the hollow, cylindrical element 1, which consists of an elastic material, is supported in the region of its chamfer 7 by the part 25 of the core 23 that is adjacent to the chamfer 7, there is no counter-force, which compensates for the pressure of the injected material, in the cylindrical part of the recess 9. The element 1 produced first is therefore deformed to such an extent, that its inner shell surface 3 comes to lie against the surface 27 of the tapering part 25 of the core 23. Because of the relatively short distance between the front end 28 of the core 23 and the base 8 of the recess 9, the form stability residing in the original hollow, cylindrical element 1 is sufficient for absorbing the external pressure in the region not supported by the core 23. After the injected plastic composition has solidified to a second injection molding 29, the mold 21 is removed by mold separation and the core 23 is pulled away in the axial direction 17.

Because of the unchanging wall thickness of the original hollow, cylindrical element 1, the outer shell surface 4 of this cylindrical element 1 is deformed into a shape, which is approximately congruent with the shell surface 27 of the core 23. Since the cross section of the core 23 tapers in the region 25, an annular depression is formed at the outer shell 4 and filled completely by the subsequently produced part 29. If its wall thickness is adequate, the plastic part 29 retains its original shape after it is removed from the mold 21, 23. Because of the slight depression in the outer side 4 of the original, hollow, cylindrical element 1 and because of the surface 30 of the injection molding 29 produced last and shaped in a complementary fashion thereto, the undercut, which brings about the nondetachability of the connection, is produced in this way. Moreover, because of the rotational symmetry of the core 23, the mutually touching surfaces 4, 30 of the connecting element 1, 29 are also rotationally symmetrical. This property makes possible the mutual rotation of the connecting elements 1, 29 about the longitudinal axis 17 of the connection.

Because the connecting element 29 approximately retains its original shape as a consequence of the relatively large wall thickness, the connecting element 1 is permanently in the deformed state shown in FIG. 3. Because of the elasticity of the mold part 1, there is constantly a friction-producing normal force between the contacting surfaces 4, 30 of the connecting elements 1, 29. As shown in FIG. 2, the constantly present frictional moment brings about a persistence of the connection in the respective position. On the other hand, because of the high quality of the surface, particularly the absence of burrs in the outer shell 4 of the connection element 1, the surface 30 of the injection molding 29, which lies against the outer shell 4, is also optimally smooth. This fact contributes decisively thereto that a very slight torque, acting from the outside, is already sufficient for a mutual twisting of the connecting elements 1, 29.

I claim:

1. A method for the injection molding of objects of at least two independent parts such that the parts are rotatable relative to each other and are not detachable from each other, the method comprising the steps of:
    molding a first one of said parts such that said first part includes a hollow, approximately cylindrical element defining a mold recess;
    surrounding said hollow, approximately cylindrical element with a mold; and
    injection molding a subsequently produced second one of said parts partially into the mold recess of the first part so as to outwardly deform said hollow, approximately cylindrical element in a rotationally symmetric manner by means of pressure from material injected into said mold recess that is used to form said second part, wherein said first and second parts are rotatable relative to each other and are not detachable from each other.

2. The method of claim 1,
    wherein said hollow, approximately cylindrical element has an inside surface which is free of burrs;
    further including the step of forming said mold with an inside surface having an arcuate depression of a constant radius; and
    wherein said step of injection molding includes the step of forcing said material into said mold recess with a pressure sufficient to outwardly deform said hollow, approximately cylindrical element such that an outer surface of said hollow, approximately cylindrical element lies against the inside surface of said mold.

3. The method of claim 2, wherein said depression in the inside surface of the mold is curved concavely relative to a central axis of said hollow, approximately cylindrical element.

4. A method for the injection molding of objects of at least two independent parts such that the parts are rotatable relative to each other and are not detachable from each other, the method comprising the steps of:
    molding a first one of said parts such that said first part includes a hollow, approximately cylindrical element defining a recess;
    surrounding said hollow, approximately cylindrical element with a mold such that a space is defined between said mold and said hollow, approximately cylindrical element;
    inserting a core at least partially within said recess; and
    injection molding a subsequently produced second one of said parts partially within said space and about the hollow, approximately cylindrical element of the first part so as to inwardly deform said hollow, approximately cylindrical element in a rotationally symmetric manner by means of pressure from material injected into said space that is used to form said second part, wherein said first and second parts are rotatable relative to each other and are not detachable from each other.

5. The method of claim 4,
    wherein said hollow, approximately cylindrical element has an outside surface which is free of burrs;
    further including the steps of forming said core as a rotationally symmetric core with at least a tapering cross-section, and inserting said core at least partially within said recess such that said core is disposed concentrically with the hollow, cylindrical element; and
    wherein said step of injection molding includes the step of forcing said material into said space with a pressure sufficient to inwardly deform said hollow, approximately cylindrical element so that an inner surface of said hollow, approximately cylindrical element lies against an outer surface of said core having said tapering cross-section.

6. The method of claim 5, wherein the tapering cross-section of the core is curved concavely relative to a central axis of the hollow, approximately cylindrical element.

* * * * *